United States Patent
Chen

(10) Patent No.: US 7,243,684 B1
(45) Date of Patent: Jul. 17, 2007

(54) FLOW DIVIDING DEVICE FOR GARDENING PIPES

(75) Inventor: Chin-Yuan Chen, Changhua Hsien (TW)

(73) Assignee: Shin Tai Spurf Water of the Garden Tools Co., Ltd., Changhua Hsien (TW)

( * ) Notice: Subject to any disclaimer, the term of this patent is extended or adjusted under 35 U.S.C. 154(b) by 0 days.

(21) Appl. No.: 11/328,871

(22) Filed: Jan. 10, 2006

(51) Int. Cl.
*F16K 11/10* (2006.01)
(52) U.S. Cl. .................... 137/883; 251/149.8
(58) Field of Classification Search ............. 137/883, 137/887, 886; 251/347, 149.8
See application file for complete search history.

(56) References Cited

U.S. PATENT DOCUMENTS

| | | | | |
|---|---|---|---|---|
| 1,472,265 A | * | 10/1923 | Bell | 137/883 |
| 2,598,961 A | * | 6/1952 | Andrus | 137/883 |
| 3,459,221 A | * | 8/1969 | Axelrod | 137/883 |
| 3,918,484 A | * | 11/1975 | Lamb | 137/553 |
| 4,432,392 A | * | 2/1984 | Paley | 137/883 |
| 5,595,207 A | * | 1/1997 | Jiles | 137/38 |
| 6,089,263 A | * | 7/2000 | Dumser | 137/552 |
| 6,830,062 B2 | * | 12/2004 | Montpetit | 137/59 |

* cited by examiner

*Primary Examiner*—John Fox
(74) *Attorney, Agent, or Firm*—Alan Kamrath; Kamrath & Associates PA

(57) ABSTRACT

A flow dividing device for gardening pipes includes a main body having a plurality of mounting studs, and a plurality of water control switches each mounted on the respective mounting stud. Each of the water control switches includes a control valve, an operation knob, and a pipe connector. Thus, the water flow of each of the water control switches is opened and closed by rotation of the operation knob, thereby facilitating a user operating the water control switches. In addition, when the pipe connector is detached from the operation knob, the pipe connector is rotatable relative to the operation knob so that the pipe connector is freely rotatable with the gardening pipe to facilitate a user rotating the gardening pipe relative to the main body.

20 Claims, 7 Drawing Sheets

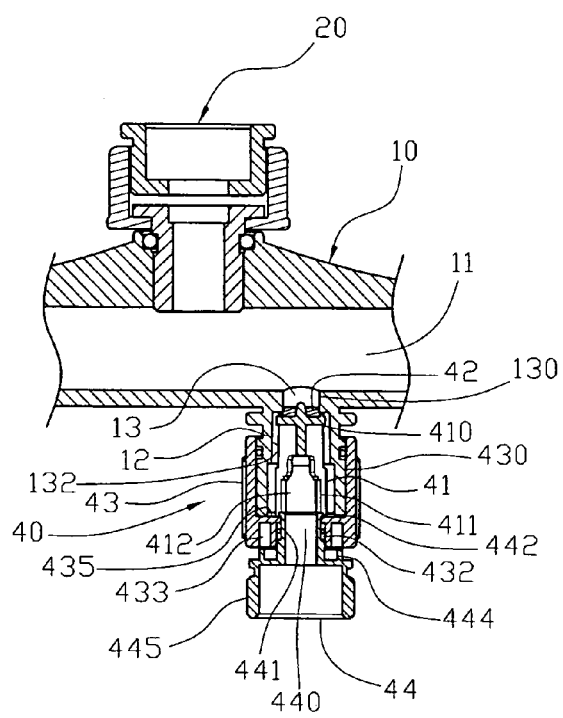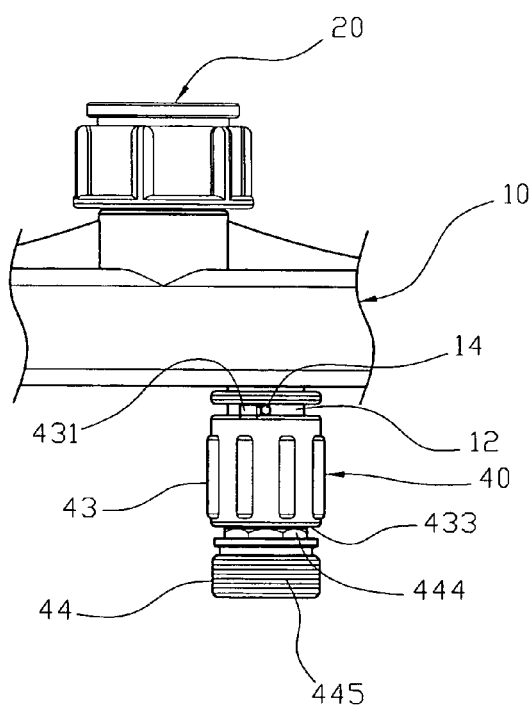
FIG. 5
FIG. 6

US 7,243,684 B1

FLOW DIVIDING DEVICE FOR GARDENING PIPES

BACKGROUND OF THE INVENTION

1. Field of the Invention

The present invention relates to a flow dividing device and, more particularly, to a flow dividing device for gardening pipes.

2. Description of the Related Art

A conventional flow dividing device for gardening pipes comprises a main body having a first side provided with a plurality of water outlets and a second side provided with a water source connector connected to a water source to supply water to the water outlets, a plurality of pipe connectors each mounted on a respective one of the water outlets of the main body and each connected to a gardening pipe which is connected to a water output equipment, such as a sprinkler or the like, and a plurality of control valves mounted on a respective one of the water outlets of the main body to open and close the respective water outlet. However, the conventional flow dividing device has a complicated construction, thereby greatly increasing the costs of fabrication. In addition, the control valves and the pipe connectors of the flow dividing device are mounted individually, so that the conventional flow dividing device is not operated easily and conveniently.

SUMMARY OF THE INVENTION

The primary objective of the present invention is to provide a flow dividing device for gardening pipes, wherein the water flow of each of the water control switches is opened and closed by rotation of the operation knob, thereby facilitating a user operating each of the water control switches.

Another objective of the present invention is to provide a flow dividing device for gardening pipes, wherein when the pipe connector is detached from the operation knob, the pivot shaft of the pipe connector is rotatable in the mounting hole of the operation knob so that the pipe connector is rotatable relative to the operation knob and is freely rotatable with the gardening pipe to facilitate a user rotating the gardening pipe relative to the main body freely.

A further objective of the present invention is to provide a flow dividing device for gardening pipes, wherein the flow dividing device has a simplified construction, thereby facilitating assembly of the flow dividing device, and thereby decreasing costs of fabrication of the flow dividing device.

Further benefits and advantages of the present invention will become apparent after a careful reading of the detailed description with appropriate reference to the accompanying drawings.

BRIEF DESCRIPTION OF THE DRAWINGS

FIG. 5 is a partially top plan cross-sectional view of the flow dividing device as shown in FIG. 1.

FIG. 6 is a partially top plan view of the flow dividing device as shown in FIG. 1.

DETAILED DESCRIPTION OF THE INVENTION

Figure 1:
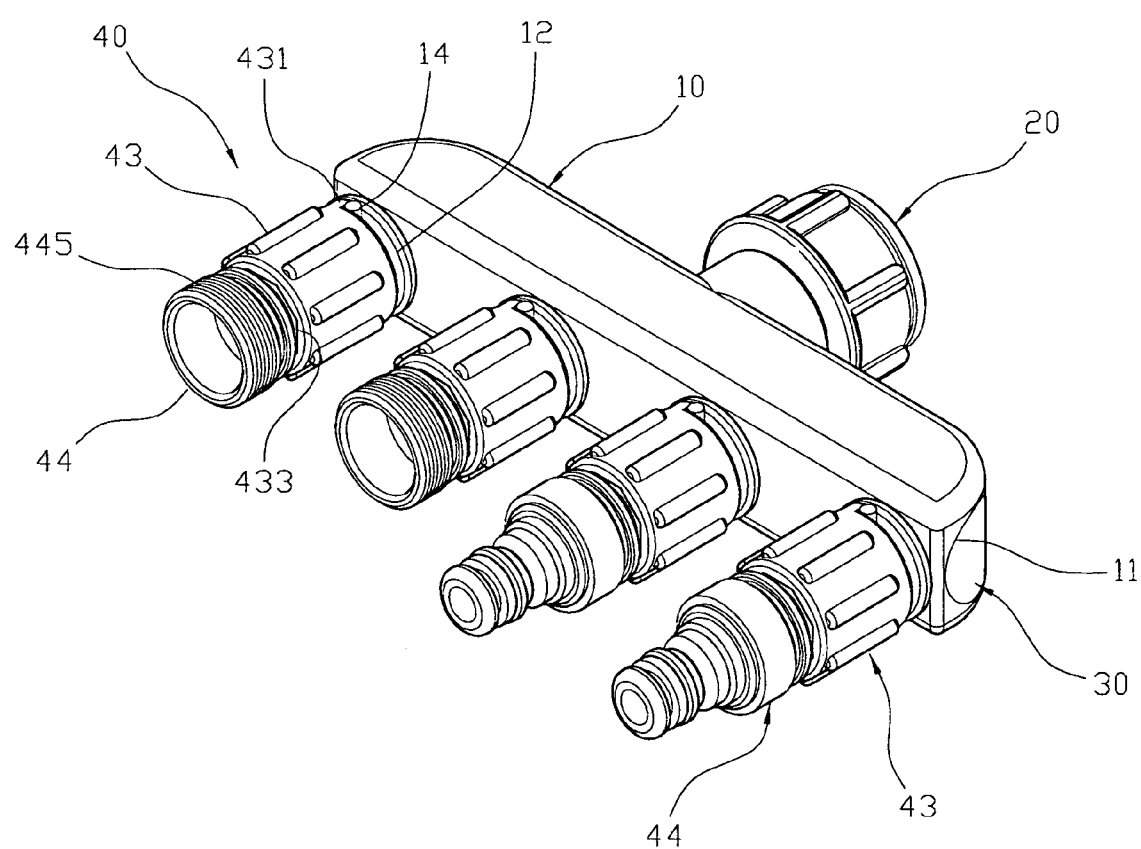
FIG. 1 is a perspective view of a flow dividing device for gardening pipes in accordance with the preferred embodiment of the present invention.

Referring to the drawings and initially to FIGS. 1–6, a flow dividing device for gardening pipes in accordance with the preferred embodiment of the present invention comprises a main body 10 having an inside formed with a water chamber 11 and having a first side provided with a plurality of mounting studs 12 each having a water passage 13 connected to the water chamber 11 and a second side provided with a water source connector 20 connected to the water chamber 11 to supply water into the water chamber 11, and a plurality of water control switches 40 each mounted on a respective one of the mounting studs 12 of the main body 10 to open and close the water passage 13 of the respective mounting stud 12 and each connected to a gardening pipe (not shown).

The water chamber 11 of the main body 10 has an open end wall, and a closure tap 30 is mounted on the open end wall of the water chamber 11 of the main body 10. Each of the mounting studs 12 of the main body 10 has an outer thread 120. The water passage 13 of each of the mounting studs 12 has a stepped shape and has a first hole 130 connected to the water chamber 11 and a second hole 132 having a diameter greater than that of the first hole 130. Each of the mounting studs 12 has a periphery provided with a limit stub 14 located adjacent to the first side of the main body 10.

Figure 9:
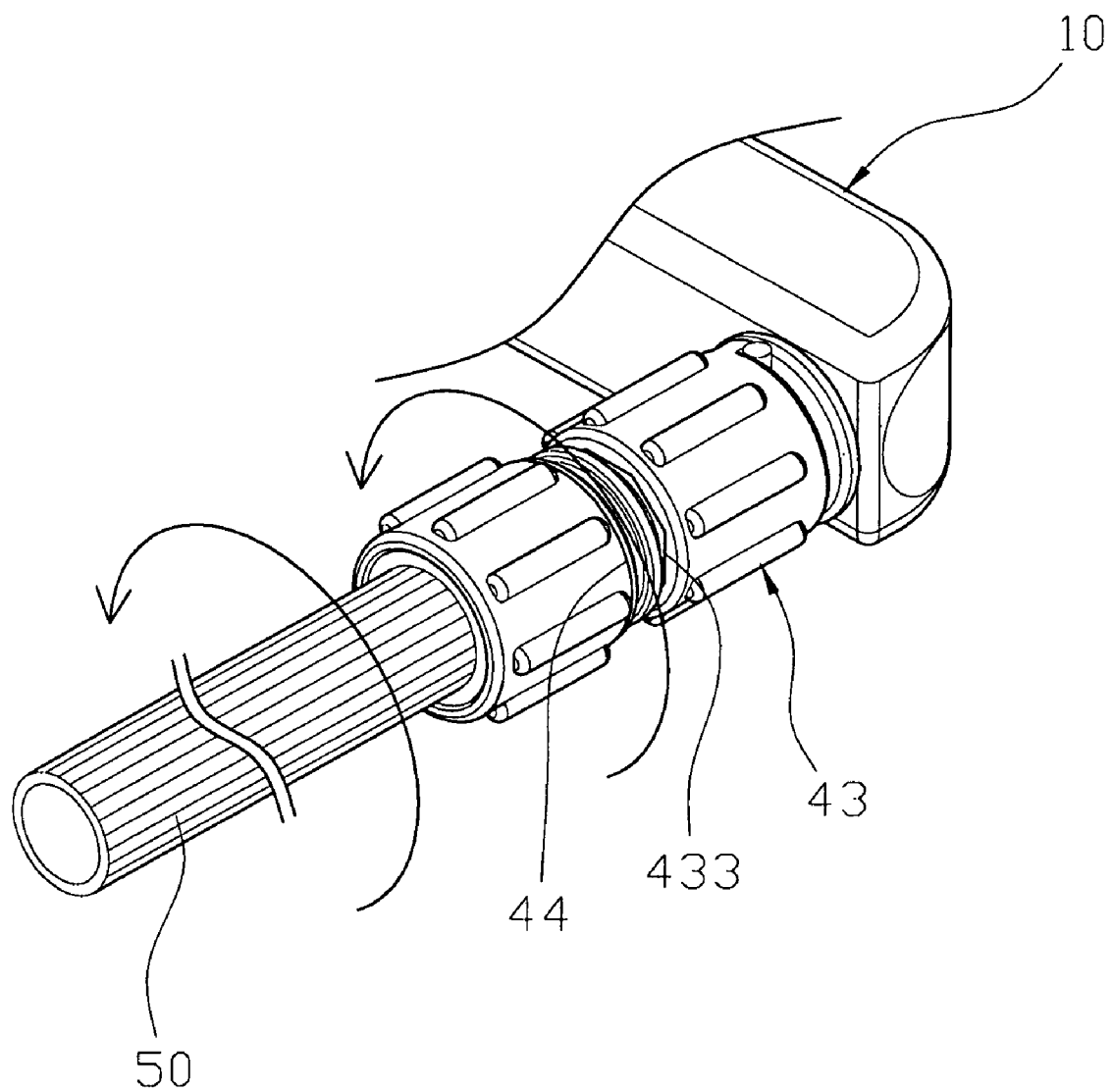
FIG. 9 is a partially cut-away schematic operational view of the flow dividing device as shown in FIG. 1.

Each of the water control switches 40 includes a control valve 41 movably mounted in the respective mounting stud 12 of the main body 10 to open and close the water passage 13 of the respective mounting stud 12, an operation knob 43 rotatably and movably mounted on the respective mounting stud 12 of the main body 10 and rested on the control valve 41 to push the control valve 41 toward the water passage 13 of the respective mounting stud 12, and a pipe connector 44 mounted on the operation knob 43 to connect a gardening pipe 50 (see FIG. 9).

The control valve 41 of each of the water control switches 40 has a first end provided with a stop portion 410 that is movable to open and close the water passage 13 of the respective mounting stud 12 and a second end provided with a plurality of resting plates 411 rested on and pushed by the operation knob 43 and a plurality of conduits 412 located between the resting plates 411 and connected to the water passage 13 of the respective mounting stud 12 when the stop portion 410 of the control valve 41 is detached from the water passage 13 of the respective mounting stud 12. The stop portion 410 of the control valve 41 has a diameter greater than that of the first hole 130 of the water passage 13 and smaller than that of the second hole 132 of the water passage 13. The stop portion 410 of the control valve 41 is provided with a sealing gasket 42 that is movable to seal the first hole 130 of the water passage 13.

The operation knob 43 of each of the water control switches 40 has a cap shape and has an inside connected to the conduits 412 of the control valve 41 and formed with a screw bore 430 screwed onto the outer thread 120 of the respective mounting stud 12 so that the operation knob 43 is movable relative to the respective mounting stud 12 by rotation of the operation knob 43. The operation knob 43 of each of the water control switches 40 has a first end provided with an inwardly extending push portion 435 rested on the resting plates 411 of the control valve 41 and a second end provided with a protruding limit edge 431 that is movable to rest on the limit stub 14 of the respective mounting stud 12 to limit rotation of the operation knob 43. The first end of the operation knob 43 has a central portion formed with a stepped mounting hole 432 mounted on the pipe connector 44 and has a periphery formed with polygonal locking hole 433 surrounding the mounting hole 432.

The pipe connector 44 of each of the water control switches 40 is rotatably mounted on the operation knob 43 and has an inside formed with a water outlet hole 440 connected to the conduits 412 of the control valve 41. The pipe connector 44 of each of the water control switches 40 has a first end formed with a reduced pivot shaft 441 pivotally mounted in the mounting hole 432 of the operation knob 43 and a second end formed with a connection 445 connected to the gardening pipe 50. The pivot shaft 441 of the pipe connector 44 is movably mounted in the mounting hole 432 of the operation knob 43 and has a distal end extended into the inside of the operation knob 43 and provided with a protruding limit flange 442 that is movable to rest on the push portion 435 of the operation knob 43 to prevent the pivot shaft 441 of the pipe connector 44 from detaching from the operation knob 43. An O-ring 443 is mounted on the pivot shaft 441 of the pipe connector 44 to seal the pivot shaft 441 of the pipe connector 44 in the mounting hole 432 of the operation knob 43. The pipe connector 44 of each of the water control switches 40 has a mediate portion formed with a polygonal locking portion 444 surrounding the pivot shaft 441 and movable to be inserted into and locked in the locking hole 433 of the operation knob 43. Thus, when the pipe connector 44 is pushed toward the operation knob 43, the locking portion 444 of the pipe connector 44 is inserted into and locked in the locking hole 433 of the operation knob 43 so that the pipe connector 44 is secured to the operation knob 43 to facilitate a user mounting the gardening pipe 50 on the pipe connector 44.

Figure 4:
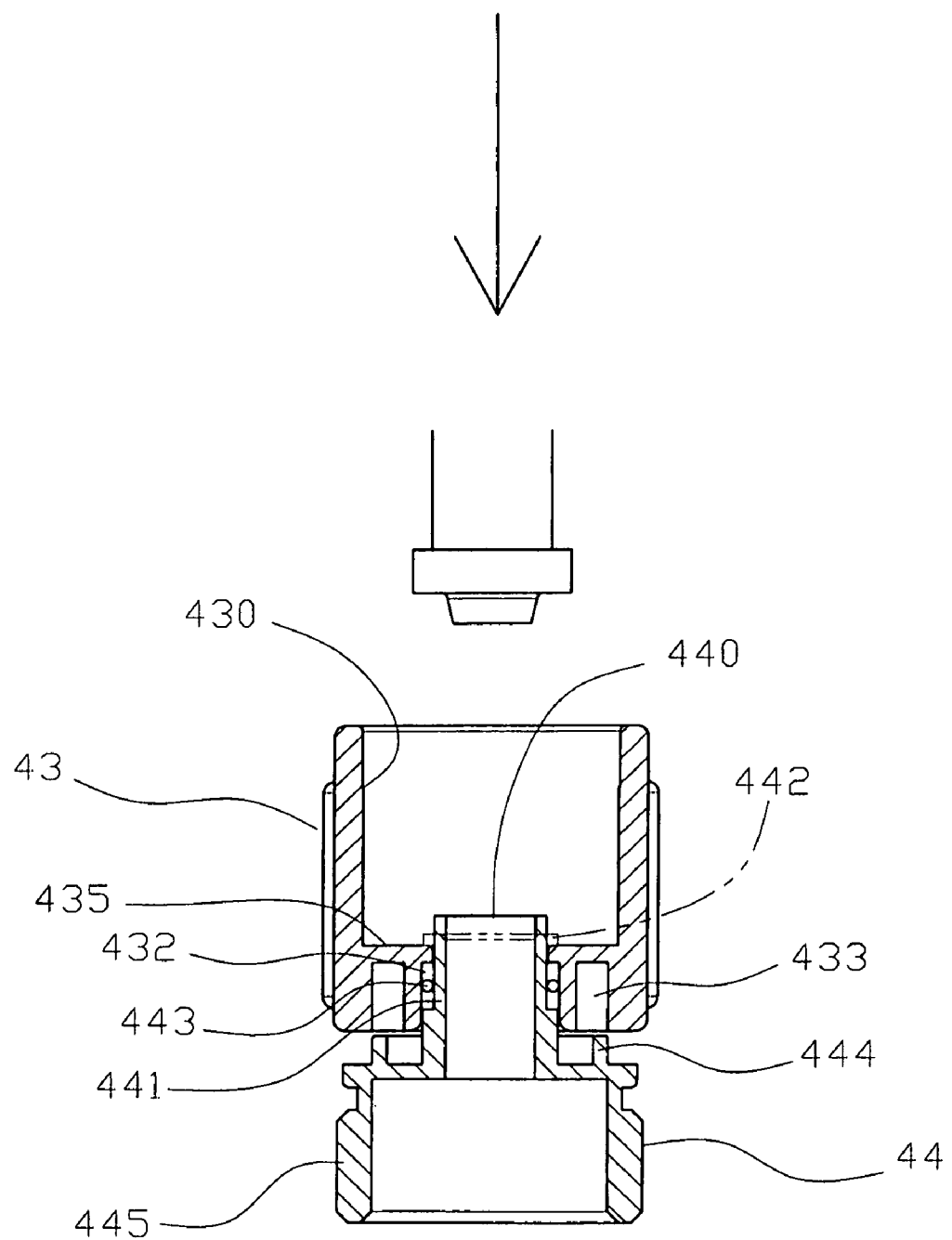
FIG. 4 is a partially plan cross-sectional assembly view of the flow dividing device as shown in FIG. 3.

In assembly, after the pivot shaft 441 of the pipe connector 44 is inserted into the mounting hole 432 of the operation knob 43 and partially extended into the inside of the operation knob 43 as shown in FIG. 4, the distal end of the pivot shaft 441 is worked by a stamping process to form the limit flange 442.

In operation, referring to FIGS. 1–6, the operation knob 43 is movable relative to the respective mounting stud 12 by rotation of the operation knob 43. Thus, when the operation knob 43 is movable toward the respective mounting stud 12, the push portion 435 of the operation knob 43 pushes the resting plates 411 of the control valve 41 to move the control valve 41 which pushes the stop portion 410 to block the first hole 130 of the water passage 13 by the sealing gasket 42 as shown in FIG. 5 to close the water passage 13 of the respective mounting stud 12 so as to interrupt the connection between the water chamber 11 of the main body 10 and each of the water control switches 40 so that the water contained in the water chamber 11 of the main body 10 cannot flow into each of the water control switches 40.

Figure 2:
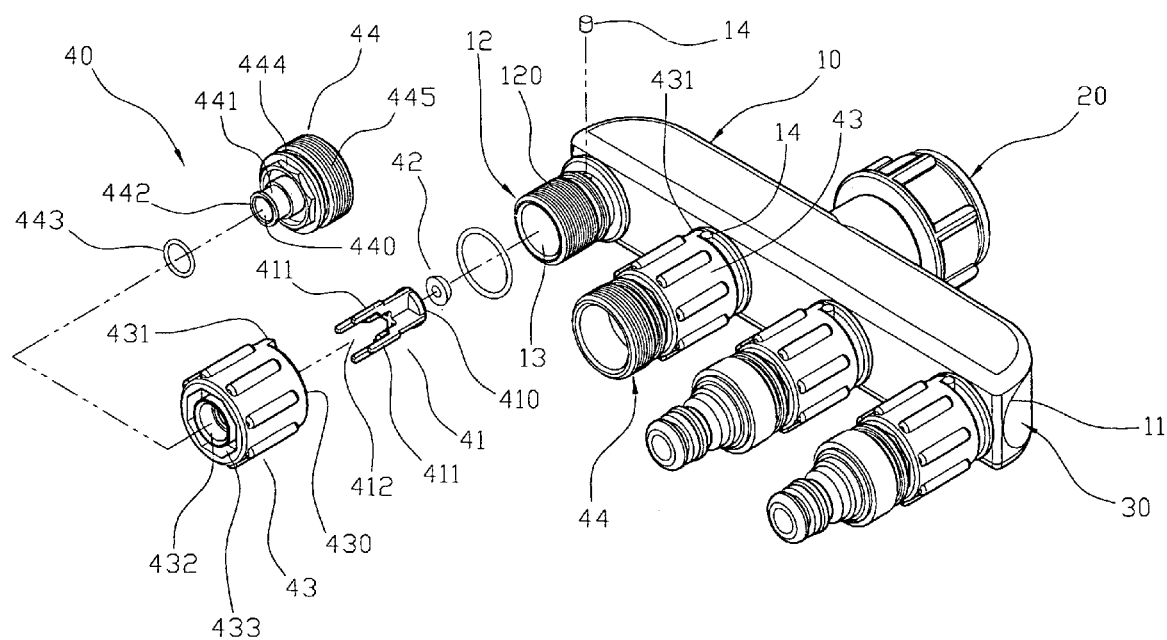
FIG. 2 is an exploded perspective view of the flow dividing device as shown in FIG. 1.
Figure 3:
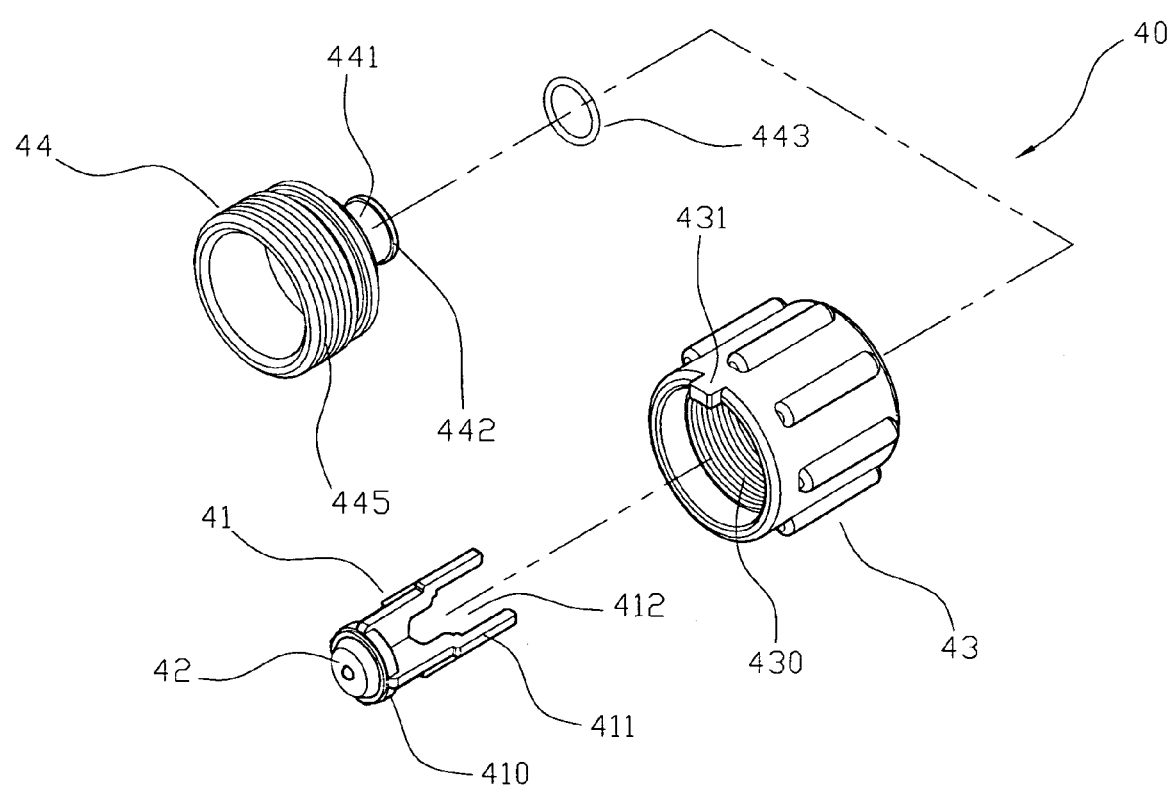
FIG. 3 is a partially exploded perspective view of the flow dividing device as shown in FIG. 1.
Figure 7:
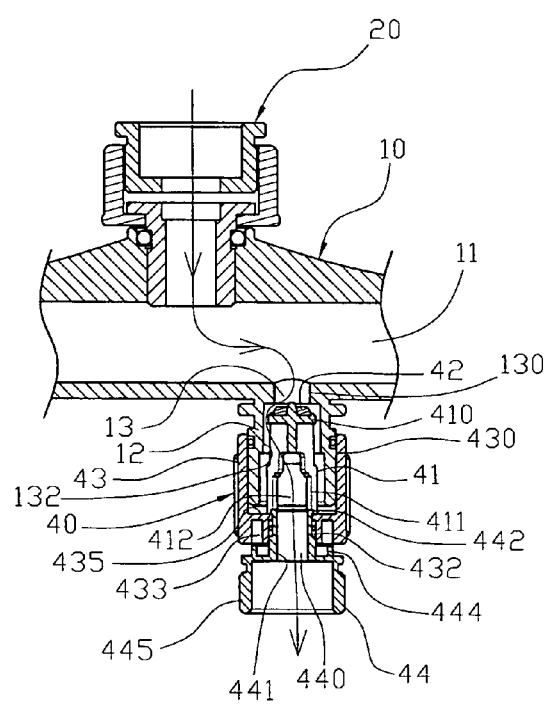
FIG. 7 is a schematic operational view of the flow dividing device as shown in FIG. 5.
Figure 8:
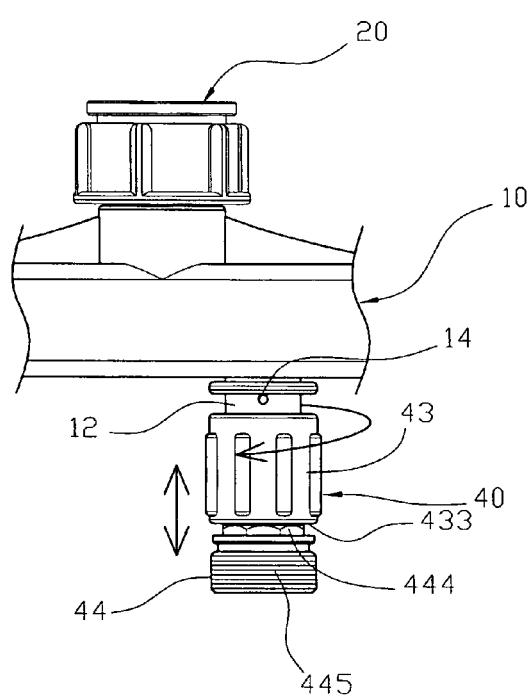
FIG. 8 is a schematic operational view of the flow dividing device as shown in FIG. 6.

Alternatively, referring to FIGS. 7 and 8 with reference to FIGS. 1–3, when the operation knob 43 is movable outward relative to the respective mounting stud 12, the push portion 435 of the operation knob 43 is detached from the resting plates 411 of the control valve 41 to release the control valve 41 so that the control valve 41 is pushed outward relative to the respective mounting stud 12 by a water pressure contained in the water chamber 11 of the main body 10 to drive the stop portion 410 and the sealing gasket 42 to detach from the first hole 130 of the water passage 13 as shown in FIG. 7 to open the water passage 13 of the respective mounting stud 12 so as to connect the water chamber 11 of the main body 10 and each of the water control switches 40. Thus, the water contained in the water chamber 11 of the main body 10 can flow into each of the water control switches 40 and in turn flows through the conduits 412 of the control valve 41 and the water outlet hole 440 of the pipe connector 44 into the gardening pipe 50 as shown in FIG. 9.

As shown in FIGS. 5 and 6, the limit edge 431 of the operation knob 43 is movable to rest on the limit stub 14 of the respective mounting stud 12 to prevent an excessive rotation of the operation knob 43.

As shown in FIGS. 4 and 9, when the pipe connector 44 is pulled outward relative to the operation knob 43, the locking portion 444 of the pipe connector 44 is detached from the locking hole 433 of the operation knob 43 so that the pipe connector 44 is detached from the operation knob 43, and the pivot shaft 441 of the pipe connector 44 is rotatable in the mounting hole 432 of the operation knob 43. Thus, the pipe connector 44 is rotatable relative to the operation knob 43 and is freely rotatable with the gardening pipe 50 as shown in FIG. 9 to facilitate a user rotating the gardening pipe 50 relative to the main body 10.

Accordingly, the water flow of each of the water control switches is opened and closed by rotation of the operation knob, thereby facilitating a user operating each of the water control switches. In addition, when the pipe connector is detached from the operation knob, the pivot shaft of the pipe connector is rotatable in the mounting hole of the operation knob so that the pipe connector is rotatable relative to the operation knob and is freely rotatable with the gardening pipe to facilitate a user rotating the gardening pipe relative to the main body freely. Further, the flow dividing device has a simplified construction, thereby facilitating assembly of the flow dividing device, and thereby decreasing costs of fabrication of the flow dividing device.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A flow dividing device, comprising a main body having an inside formed with a water chamber and having a first side provided with a plurality of mounting studs each having a water passage connected to the water chamber and a second side provided with a water source connector connected to the water chamber, and a plurality of water control switches each mounted on a respective one of the mounting studs of the main body, wherein each of the water control switches includes:

a control valve movably mounted in the respective mounting stud of the main body to open and close the water passage of the respective mounting stud;

an operation knob rotatably and movably mounted on the respective mounting stud of the main body and rested on the control valve to push the control valve toward the water passage of the respective mounting stud;

a pipe connector mounted on the operation knob to connect a gardening pipe.

2. The flow dividing device in accordance with claim 1, wherein the control valve of each of the water control switches has a first end provided with a stop portion that is movable to open and close the water passage of the respective mounting stud and a second end provided with a plurality of resting plates rested on and pushed by the operation knob and a plurality of conduits connected to the water passage of the respective mounting stud when the stop portion of the control valve is detached from the water passage of the respective mounting stud.

3. The flow dividing device in accordance with claim 2, wherein the conduits of the control valve are located between the resting plates.

4. The flow dividing device in accordance with claim 1, wherein the water passage of each of the mounting studs has a stepped shape.

5. The flow dividing device in accordance with claim 2, wherein the water passage of each of the mounting studs has a first hole connected to the water chamber and a second hole having a diameter greater than that of the first hole.

6. The flow dividing device in accordance with claim 5, wherein the stop portion of the control valve has a diameter greater than that of the first hole of the water passage and smaller than that of the second hole of the water passage.

7. The flow dividing device in accordance with claim 5, wherein the stop portion of the control valve is provided with a sealing gasket that is movable to seal the first hole of the water passage.

8. The flow dividing device in accordance with claim 1, wherein each of the mounting studs of the main body has an outer thread, and the operation knob of each of the water control switches has an inside formed with a screw bore screwed onto the outer thread of the respective mounting stud so that the operation knob is movable relative to the respective mounting stud by rotation of the operation knob.

9. The flow dividing device in accordance with claim 1, wherein the operation knob of each of the water control switches has a cap shape.

10. The flow dividing device in accordance with claim 1, wherein the operation knob of each of the water control switches has an inside connected to the conduits of the control valve.

11. The flow dividing device in accordance with claim 2, wherein the operation knob of each of the water control switches has a first end provided with an inwardly extending push portion rested on the resting plates of the control valve.

12. The flow dividing device in accordance with claim 11, wherein each of the mounting studs has a periphery provided with a limit stub located adjacent to the first side of the main body, and the operation knob of each of the water control switches has a second end provided with a protruding limit edge that is movable to rest on the limit stub of the respective mounting stud to limit rotation of the operation knob.

13. The flow dividing device in accordance with claim 11, wherein the first end of the operation knob has a central portion formed with a stepped mounting hole mounted on the pipe connector, and the pipe connector of each of the water control switches has a first end formed with a reduced pivot shaft pivotally mounted in the mounting hole of the operation knob and a second end formed with a connection connected to the gardening pipe.

14. The flow dividing device in accordance with claim 13, wherein the first end of the operation knob has a periphery formed with polygonal locking hole surrounding the mounting hole, and the pipe connector of each of the water control switches has a mediate portion formed with a polygonal locking portion surrounding the pivot shaft and movable to be inserted into and locked in the locking hole of the operation knob.

15. The flow dividing device in accordance with claim 13, wherein the pivot shaft of the pipe connector is movably mounted in the mounting hole of the operation knob and has a distal end extended into an inside of the operation knob and provided with a protruding limit flange that is movable to rest on the push portion of the operation knob to prevent the pivot shaft of the pipe connector from detaching from the operation knob.

16. The flow dividing device in accordance with claim 13, further comprising an O-ring mounted on the pivot shaft of the pipe connector to seal the pivot shaft of the pipe connector in the mounting hole of the operation knob.

17. The flow dividing device in accordance with claim 2, wherein the pipe connector of each of the water control switches is rotatably mounted on the operation knob and has an inside formed with a water outlet hole connected to the conduits of the control valve.

18. The flow dividing device in accordance with claim 14, wherein the locking portion of the pipe connector is detached from the locking hole of the operation knob when the pipe connector is pulled outward relative to the operation knob, so that the pipe connector is detached from the operation knob, and the pivot shaft of the pipe connector is rotatable in the mounting hole of the operation knob.

19. The flow dividing device in accordance with claim 1, wherein the water chamber of the main body has an open end wall, and the flow dividing device further comprises a closure tap mounted on the open end wall of the water chamber of the main body.

20. The flow dividing device in accordance with claim 15, wherein the distal end of the pivot shaft is worked to form the limit flange after the pivot shaft of the pipe connector is inserted into the mounting hole of the operation knob and partially extended into the inside of the operation knob.

* * * * *